US 7,904,553 B1

(12) United States Patent
Ham et al.

(10) Patent No.: US 7,904,553 B1
(45) Date of Patent: Mar. 8, 2011

(54) TRANSLATING NETWORK DATA INTO CUSTOMER AVAILABILITY (75) Inventors: David M. Ham, Ashburn, VA (US); Shane A. Lobo, Orlando, FL (US); Brian Lushear, Orlando, FL (US); Matthew Mariscal, Winter Park, FL (US); Steve D. Parrott, Clifton, VA (US); Drew Shinholster, Maitland, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 225 days.

(21) Appl. No.: 12/273,537

(22) Filed: Nov. 18, 2008

(51) Int. Cl.
G06F 15/173 (2006.01)

(52) U.S. Cl. ......... 709/224; 709/217; 709/218; 709/219; 709/223; 709/225; 709/238

(58) Field of Classification Search .................. 709/217, 709/218, 219, 223, 224, 225, 238
See application file for complete search history.

(56) References Cited

U.S. PATENT DOCUMENTS

| | | | |
|---|---|---|---|
| 5,898,826 | A | 4/1999 | Pierce et al. |
| 6,046,988 | A | 4/2000 | Schenkel et al. |
| 6,570,867 | B1 | 5/2003 | Robinson et al. |
| 6,700,967 | B2 * | 3/2004 | Kleinoder et al. ......... 379/201.1 |
| 6,792,273 | B1 | 9/2004 | Tellinger et al. |
| 6,813,634 | B1 | 11/2004 | Ahmed |
| 6,973,042 | B1 | 12/2005 | Fitzgerald |
| 6,978,223 | B2 | 12/2005 | Milliken |
| 7,099,305 | B1 * | 8/2006 | Fardid .......................... 370/352 |
| 7,099,912 | B2 | 8/2006 | Ishizaki et al. |
| 7,110,362 | B2 | 9/2006 | Kato |
| 7,143,152 | B1 | 11/2006 | Elman |
| 7,376,719 | B1 | 5/2008 | Shafer et al. |
| 7,376,864 | B1 | 5/2008 | Hu et al. |
| 7,424,526 | B1 | 9/2008 | Hansen et al. |
| 7,467,225 | B2 | 12/2008 | Anerousis et al. |
| 7,751,392 | B1 | 7/2010 | Gonzalez et al. |
| 7,830,816 | B1 | 11/2010 | Gonzalez et al. |
| 7,831,709 | B1 | 11/2010 | Ham et al. |
| 2002/0022985 | A1 * | 2/2002 | Guidice et al. .................. 705/10 |
| 2002/0078232 | A1 | 6/2002 | Simpson et al. |
| 2002/0087393 | A1 | 7/2002 | Philonenko |
| 2002/0103921 | A1 | 8/2002 | Nair et al. |
| 2002/0164007 | A1 | 11/2002 | Henits |
| 2002/0181047 | A1 | 12/2002 | Lauder et al. |

(Continued)

OTHER PUBLICATIONS

Gonzalez, Jose, et al., "Integrated Network and Customer Database", U.S. Appl. No. 11/551,704, filed Oct. 21, 2006.

(Continued)

Primary Examiner — Liangche A Wang (57) ABSTRACT

A system is provided for translating network data into customer availability. The system includes a processor, a user interface, and a database manager. The database manager, when executed by the processor, parses router configurations to determine port data for each port on each router in a network, and integrates the port data with customer data to create an integrated database. The database manager also determines a planned port availability for the customer based on the integrated database and port state data, and determines port outages based on port outage data, card outage data, and router outage data. Additionally, the database manager determines an actual port availability for a customer based on the integrated database and concurrent outages identified for the port outages, and outputs a customer availability to the user interface, wherein the customer availability is based on the actual port availability and the planned port availability.

20 Claims, 4 Drawing Sheets

U.S. PATENT DOCUMENTS

| | | | |
|---|---|---|---|
| 2003/0055972 | A1 | 3/2003 | Fuller et al. |
| 2003/0145072 | A1 | 7/2003 | Lau et al. |
| 2004/0006618 | A1 | 1/2004 | Kasai et al. |
| 2004/0059781 | A1* | 3/2004 | Yoakum et al. ............... 709/204 |
| 2004/0064581 | A1 | 4/2004 | Shitama et al. |
| 2004/0071164 | A1 | 4/2004 | Baum |
| 2004/0210621 | A1* | 10/2004 | Antonellis ................... 709/200 |
| 2005/0091482 | A1 | 4/2005 | Gray et al. |
| 2005/0094653 | A1 | 5/2005 | Milburn et al. |
| 2005/0240835 | A1 | 10/2005 | Dragnea et al. |
| 2006/0146694 | A1 | 7/2006 | Hamaguchi et al. |
| 2006/0215577 | A1 | 9/2006 | Guichard et al. |
| 2006/0268740 | A1 | 11/2006 | Rosenberg et al. |
| 2007/0041554 | A1 | 2/2007 | Newman et al. |
| 2007/0050497 | A1 | 3/2007 | Haley et al. |
| 2007/0250625 | A1 | 10/2007 | Titus |
| 2007/0274285 | A1 | 11/2007 | Werber et al. |
| 2009/0201911 | A1* | 8/2009 | Dupertuis et al. ............ 370/352 |

OTHER PUBLICATIONS

Gonzalez, Jose, et al., "Customer Link Diversity Monitoring", U.S. Appl. No. 11/620,140, filed Jan. 5, 2007.

Gonzalez, Jose, et al., "Virtual Link Mapping", U.S. Appl. No. 11/746,273, filed May 9, 2007.

Gonzalez, Jose, et al., "Network Access and Quality of Service Troubleshooting", U.S. Appl. No. 11/838,175, filed Aug. 13, 2007.

Ham, David M., et al., "Flexible Grouping for Port Analysis", U.S. Appl. No. 12/036,289, filed Feb. 24, 2008.

Office Action dated Mar. 2, 2009, U.S. Appl. No. 11/551,704, filed Oct. 21, 2006, 16 pages.

Final Office Action dated Aug. 13, 2009, U.S. Appl. No. 11/551,704, filed Oct. 21, 2006, 22 pages.

Office Action (Advisory Action) dated Oct. 16, 2009, U.S. Appl. No. 11/551,704, filed Oct. 21, 2006, 3 pages.

Office Action dated Dec. 31, 2009, U.S. Appl. No. 11/551,704, filed Oct. 21, 2006, 30 pages.

Office Action dated May 20, 2010, U.S. Appl. No. 11/551,704, filed Oct. 21, 2006, 33 pages.

Office Action dated Jun. 15, 2009, U.S. Appl. No. 11/620,140, filed Jan. 5, 2007, 16 pages.

Final Office Action dated Nov. 27, 2009, U.S. Appl. No. 11/620,140, filed Jan. 5, 2007, 17 pages.

Advisory Action dated Feb. 17, 2010, U.S. Appl. No. 11/620,140, filed Jan. 5, 2007, 3 pages.

Notice of Allowance dated Mar. 22, 2010, U.S. Appl. No. 11/620,140, filed Jan. 5, 2007, 10 pages.

Office Action dated May 25, 2010, U.S. Appl. No. 11/746,273, filed May 9, 2007, 13 pages.

Office Action dated Apr. 3, 2009, U.S. Appl. No. 11/838,175, filed Aug. 13, 2007, 14 pages.

Final Office Action dated Nov. 24, 2009, U.S. Appl. No. 11/838,175, filed Aug. 13, 2007, 14 pages.

Advisory Action dated Mar. 24, 2010, U.S. Appl. No.11/838,175, filed Aug. 13, 2007, 3 pages.

Notice of Allowance dated Aug. 2, 2010, U.S. Appl. No. 11/838,175, filed Aug. 13, 2007, 19 pages.

Office Action—First Action Interview Pilot Program Pre-Interview Communication dated Apr. 2, 2010, U.S. Appl. No. 12/036,289, filed Feb. 24, 2008, 31 pages.

Notice of Allowance dated Jul. 26, 2010, U.S. Appl. No. 12/036,289, filed Feb. 24, 2008, 18 pages.

Notice of Allowance dated Oct. 28, 2010, U.S. Appl. No. 11/551,704, filed on Oct. 21, 2006.

Final Office Action dated Nov. 19, 2010, U.S. Appl. No. 11/746,273, filed on May 9, 2007.

* cited by examiner

TRANSLATING NETWORK DATA INTO CUSTOMER AVAILABILITY

CROSS-REFERENCE TO RELATED APPLICATIONS

This application includes subject matter related to the following applications, which are hereby incorporated by reference: U.S. patent application Ser. No. 11/551,704, filed Oct. 21, 2006, entitled "Integrated Network and Customer Database," by Jose Gonzalez, et al.; U.S. patent application Ser. No. 11/620,140, filed Jan. 5, 2007, entitled "Customer Link Diversity Monitoring," by Jose Gonzalez, et al.; U.S. patent application Ser. No. 11/838,175, filed Aug. 13, 2007, entitled "Network Access and Quality of Service Troubleshooting," by Jose Gonzalez, et al.; and U.S. patent application Ser. No. 12/036,289, filed Feb. 24, 2008, entitled "Flexible Grouping for Port Analysis," by David Ham, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network service provider may monitor the status of network devices through a network monitoring system that includes network data for network devices. Additionally, a customer service representative may access a separate customer service system to retrieve customer information.

SUMMARY

In some embodiments, a system is provided for translating network data into customer availability. The system includes a processor, a user interface, and a database manager. The database manager, when executed by the processor, parses router configurations to determine port data for each port on each router in a network, and integrates the port data with customer data to create an integrated database. The database manager also determines a planned port availability for a customer that accesses a plurality of ports on a plurality of cards on a plurality of routers based on the integrated database and port state data, and determines port outages based on port outage data, card outage data, and router outage data. Additionally, the database manager determines an actual port availability for a customer based on the integrated database and concurrent outages identified for the port outages, and outputs a customer availability to the user interface, wherein the customer availability is based on the actual port availability and the planned port availability.

In some embodiments, a computer implemented method is provided for translating network data into customer availability. Router configurations are parsed to determine port data for each port on each router in a network. The port data is integrated with customer data to create an integrated database. A planned port availability is determined for a customer that accesses a plurality of ports on a plurality of cards on a plurality of routers based on the integrated database and port state data. Port outages are determined based on port outage data, card outage data, and router outage data. An actual port availability is determined for the customer based on the integrated database and concurrent outages identified for the port outages. A customer availability is output to a user interface, wherein the customer availability is based on the actual port availability and the planned port availability.

In some embodiments, a computer implemented method is provided for planning maintenance. Router configurations are parsed to determine port connectivity information for each port on each router in a network. The port connectivity information is integrated with customer data to create an integrated database. A planned port availability is projected for a customer that accesses a plurality of ports on a plurality of cards on a plurality of routers based on the integrated database and projected port state data. Port outages are projected based on projected port outage data, projected card outage data, and projected router outage data. An actual port availability is projected for the customer based on the integrated database and concurrent outages identified for the projected port outages. A projected customer availability is compared to an availability specified in a service level agreement, wherein the projected customer availability is based on the actual port availability and the planned port availability. A maintenance recommendation is output to a user interface to promote a management action to address the maintenance recommendation, wherein the maintenance recommendation is based on comparing the projected customer availability to the availability specified in the service level agreement.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A network service provider may monitor the status of ports through a network monitoring system to determine the availability of a customer's ports, or customer availability. A port is the physical interface between a router and a circuit or cable, and typically resides on a circuit card that resides in a router. Customer availability may be defined as the relationship between how many ports were functioning properly for a customer during a time period relative to how many ports were planned to be available for the customer during the time period. Customer availability may be expressed as a percentage, such as 95% port availability for a customer. Port availability calculations may be based on when a customer calls a customer service representative to report a network device outage, a process which may introduce various human errors into customer availability calculations. The network monitoring system may not have customer data that would enable a technician to determine which customers may be impacted by work on a network device that provides service to customers or the degree of the impact for any of the customers. Additionally, a customer service representative accessing a network monitoring system and a separate customer service system may be unable to verify a customer claim that network service is currently unavailable for some of the customer's computers or that network service was completely unavailable for a number of days during a preceding week.

A system is provided to translate network data into customer availability. The system retrieves router configurations to create an integrated database. The system accesses information in router configurations instead of directly accessing routers, thus eliminating the possibility of interfering with router operation. After the system retrieves the network information from the router configuration, a database manager integrates the network information with customer information to create an integrated database for subsequent access. The system may periodically update the integrated database with new network information and customer information.

The database manager determines a planned port availability for a customer using the integrated database and port state data because not all of the ports allocated to the customer during a time period may have been allocated to the customer for the entire time period. For example, the integrated database includes port state data for a customer that indicates that one of the customer's ports was discontinued by customer request halfway through February, another one of the customer's port was ordered and put into operations in mid-February, and thirteen of the customer's ports were in operation for the customer during the entire month of February. For this example, the integrated database and port state data indicate a planned port availability of fourteen (thirteen full and two halves) for February, in contrast to the total of fifteen different ports allocated to the customer during February.

The database manager determines port outages based on port outage data, card outage data, and router outage data. The database manager may determine port outages based on processing network events that indicate port outages or by polling ports to detect port outages. However, determining port outages may result in double counting or triple counting outages for a port. For example, a port experiences an outage from the first week of February through the third week of February, the card on which the port resides experiences its own outage from the second week of February through the third week of February, and the router on which the port resides experiences its own outage during the third week of February. When a card experiences an outage, all of the card's ports also experience an outage, and when a router experiences an outage, all of the router's ports also experience an outage. In response to these outages, the customer may report three different network device outages to three different customer service representatives, who may enter network device outage information that accumulates to indicate that the port experienced six weeks of outages during the first three weeks of February. Therefore, the database manager determines an actual port availability for the customer using the integrated database and concurrent outages identified for the port outages. Continuing the previous example, the database manager uses the integrated database to determine the relationship between the customer's ports, cards, and routers, thereby eliminating double and triple counting. Therefore, the database manager calculates an actual port availability that indicates the customer experienced an outage on the specified port for three weeks in February. The database manager may divide actual port availability by the planned port availability to determine the customer availability, such as 95% port availability for the customer, and output the customer availability to a user interface.

In some embodiments, the database manager plans maintenance by calculating a projected customer availability rather than a historical customer availability. For example, the database manager records projected outages for ports, cards, and routers during March based on planned maintenance for these network devices. In some embodiments, the database manager calculates a projected customer availability based on statistical projections of unplanned outages using historical data for these network devices. The database manager determines how many ports are projected to be operational for a customer during March, and uses the integrated database to calculate the projected availability for customer's ports in March. If the projected availability is below an availability specified in a service level agreement, the database manager may output a recommendation for rescheduling some of the planned maintenance at a later date, or may actually reschedule the planned maintenance. The planned maintenance is spread out over time to reduce the possibility that during the planned maintenance any affected customer will drop below the availability level specified in their service level agreement. The projected availability may take into account a historical estimate of unplanned outages to add in a margin of safety.

Figure 1:
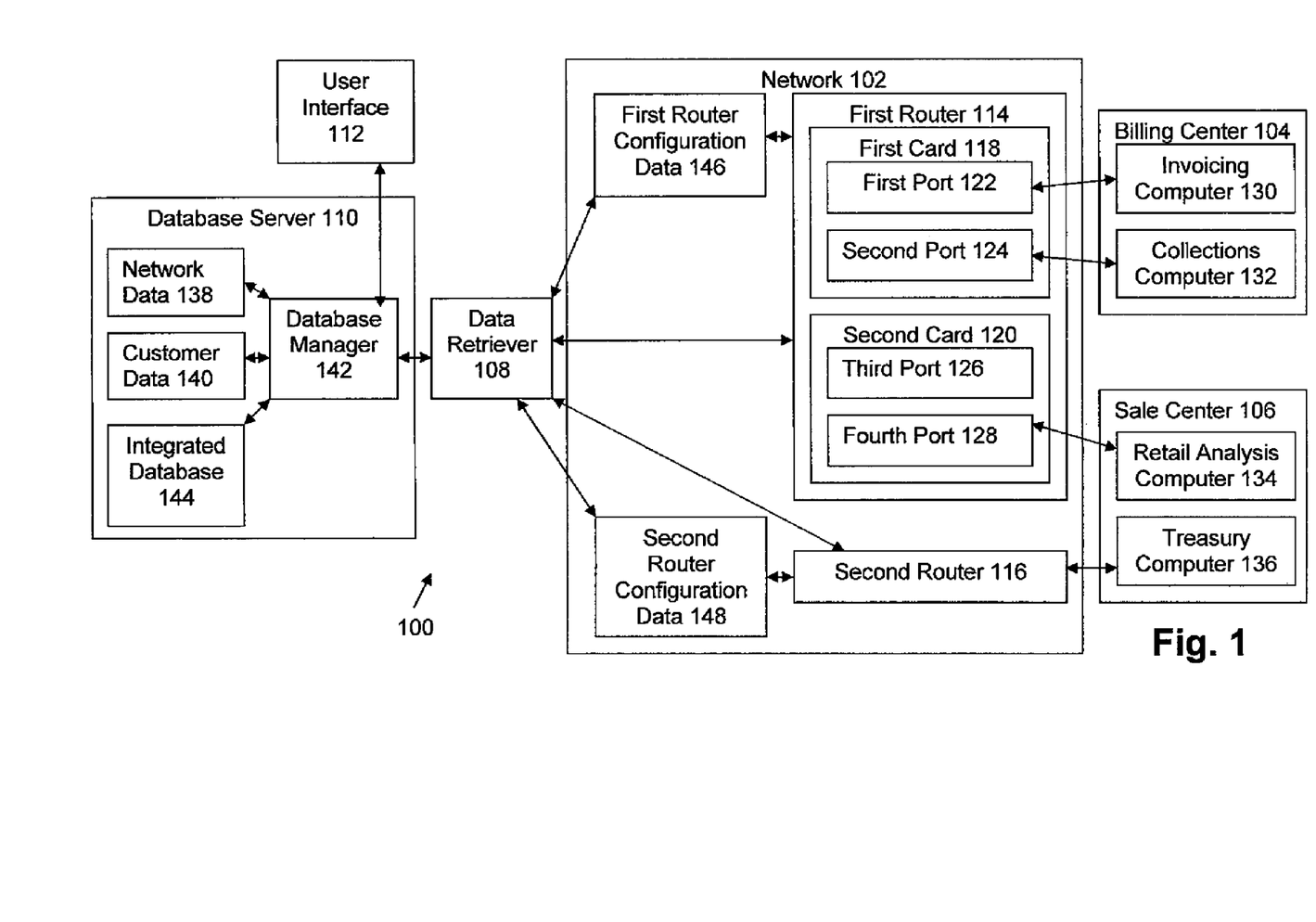
FIG. 1 illustrates a system for translating network data into customer availability according to some embodiments of the present disclosure.

Turning now to FIG. 1, an illustrative system 100 is depicted for translating network data into customer availability. The numbers of each type of component in the system 100 are depicted in FIG. 1 for the purpose of an illustrative example, as the system 100 can include any number of each component type. The system 100 includes a network 102, a billing center 104, a sale center 106, a data retriever 108, a database server 110, and a user interface 112. The network 102 provides communication services to the billing center 104 and the sale center 106. The data retriever 108 retrieves data from the network 102 and stores the data in the database server 110, where the data may be accessed by the user interface 112.

The network 102 includes a first router 114 and a second router 116. The first router 114 includes a first card 118 and a second card 120, and the second router 116 also includes cards, which are not depicted in FIG. 1. Each router 114-116 forwards data packets across the network 102 toward their destinations. The network 102 may include thousands of routers 114-116 for routing messages between computers and other electronic devices, such as mobile phones, personal digital assistants, media players, and other communication enabled electronic devices. Each card 118-120 can include multiple ports that each link with a customer computer. For example, the first card 118 includes a first port 122 and a second port 124, and the second card 120 includes a third port 126 and a fourth port 128. One customer can have multiple customer computers that link to the network 102 through the routers 114-116. The billing center 104 for the customer includes an invoicing computer 130 linked to the first port 122 on the first card 118 on the first router 114 and a collections computer 132 linked to the second port 124 on the first card 118 on the first router 114. Additionally, the sales center 106 for the customer includes a retail analysis computer 134 linked to the fourth port 128 on the second card 120 on the first router 114 and a treasury computer 136 linked to the second router 116 via a port and a card that are not illustrated in FIG. 1.

The data retriever 108 retrieves data from network devices, such as the first router 114 and the second router 116 that communicate with the network 102. The data can include network data 138 that identifies which routers, cards, and ports are connected to which customers at which locations.

The database server 110 stores the network data 138 from the network 102 with customer data 140 to enable a database manager 142 to create an integrated database 144. The network data 138 and the customer data 140 may be stored and accessed in separate databases in addition to being integrated to create the integrated database 144. If the network data 138 and the customer data 140 are stored in separate databases, the database manager 142 may function as an integrated searching interface that accesses a virtual integrated database 144 that uses distributed storage. The network data 138 can include data for multiple networks 102, with each network 102 including any number of routers 114-116 and data for each of the routers 114-116. The network data 138 can be compiled from first router configuration data 146 and second router configuration data 148 that are stored off-line in non-volatile memory in data stores as recovery files. The first router configuration data 146 and the second router configuration data 148 enable the first router 114 and the second router 116, respectively, to recover after power outages or router maintenance. The first router configuration data 146 can be stored in an off-line backup data store on board the first router 114, and the second router configuration data 148 can be stored in an off-line backup data store on board the second router 118. The on-line routers 114-116 can store their router configurations in the off-line backup data stores periodically, such as each day when throughput is low. By accessing router configuration information via the first router configuration data 146 and the second router configuration data 148, the data retriever 108 has the option of not directly accessing the first router 114 or the second router 116. Not directly accessing the routers 114-116 eliminates the possibility of interfering with router operation. Although depicted as retrieving the network data 138 from only one network 102, the data retriever 108 can retrieve the network data 138 from any number of networks 102. Likewise, the database manager 142 can integrate the network data 138 from any number of networks 102 with the customer data 140 to create the integrated database 144. A user can input the customer data 140 through the user interface 102 to the database server 110.

The database manager 142 identifies each port for the customer in the integrated database 144 and identifies the state of each port for the customer over time based on the port state data. For example, the integrated database 144 identifies 15 ports allocated to the customer in February, and the port state data identifies the state of these ports during February. The database manager 142 determines an amount of time that each port for the customer was in an operational state, and compiles a total port availability based on the amount of time that each port for the customer was in the operational state. For example, the database manager 142 determines that 13 of the customer's ports were in an operational state for all of February and 2 of the customer's ports were in an operational state for half of February, which totals to the planned port availability that is equivalent to 56 weeks (13 ports multiplied by 4 weeks and 2 ports multiplied by 2 weeks) of planned port availability in February.

The database manager 142 determines port outages based on port outage data, card outage data, and router outage data. Router outages and card outages impact network availability, for which the network service provider is responsible. However, port outages may be the responsibility of the network service provider or the responsibility of the customer because customer actions may result in port outages. The database manager 142 may process network events to determine port outages. The database manager 142 may receive network events from the simple network management protocol (SNMP), the Syslog protocol, or from manual entry, such as when an operator enters a network event that the database manager 142 did not receive. If the operation for a specific port degrades, causing an outage for the port, the status for the port may be set to down. An outage for a port may trigger a network event that is recorded by the integrated database 144 to specify the beginning of a shutdown period for the port. For example, a network event occurs when the status for "Acme Homes" first port 122 changes from "up" to "down." The database manager 142 processes such a network event to modify the network data 138 and the integrated database 144 to reflect the change in the status for "Acme Homes" first port 122 from "up" to "down." The integrated database 144 also records whether the outage is planned, such as for maintenance, or unplanned, such as for power outages. The status for the port remains set to "down" until the condition that determined the status for the port changes, which may be another network event recorded by the integrated database 144.

The data retriever 108 may poll a router to determine port outages. For example, the data retriever 108 polls the first port 122 on the first router 114, which is located in Atlanta. In contrast to the network events method described above, which may result in waiting for the time period of a remote ping test to expire before a network event identifies a change in the status for the first port 122, the polling method results in the data retriever 108 retrieving the status for the first port 22 polled.

The database manager 142 identifies each of the customer's ports in the integrated database 144 and identifies an amount of time that each of the customer's ports is associated with the port outages. For example, the database manager 142 identifies 15 customer ports that are associated with 3 weeks of port outages, 2 weeks of card outages, and 1 week of router outages. The database manager 142 also identifies an amount of time that each of the customer's ports is associated with the concurrent outages. Concurrent outages may be identified as a router outage for a router that coincides with a port outage for a port on the router and a card outage for a card that coincides with a port outage for a port on the card. For example, if the first port 122 was out for the first, second, and third week of February, the first card 118 was out for the second and third weeks of February, and the first router 114 was out for third week of February, the first router 114 outage and the first card 118 outage were each concurrent with the first port 122 outage.

The database manager 142 subtracts the amount of time that each of the customer's ports is associated with the concurrent outages from the amount of time that each of the customer's ports is associated with the port outages to determine a customer port outage time. For example, the database manager 142 subtracts the 2 concurrent weeks of the first card 118 outage and the 1 concurrent week of the first router 114 outage from the six weeks of network device outages (3 weeks of port outages plus 2 weeks of card outages plus 1 week of router outages) to produce 3 weeks of the customer's first port 122 outage time. The database manager 142 subtracts the customer port outage time from an amount of time for the planned port availability. For example, the database manager 142 subtracts the 3 weeks of the customer's first port 122 outage from the 56 weeks of planned port availability to result in 53 weeks of actual port availability in February.

The database manager 142 may calculate the customer availability by dividing the actual port availability by the planned port availability, and output the customer availability to the user interface 112. For example, the database manager 142 divides the 53 weeks of actual port availability by the 56 weeks of planned port availability to result in a 95% customer availability for February, which the database manager 142 outputs to the user interface 112.

The database manager 142 may also calculate a projected customer availability. For example, the database manager 142 records projected outages of 1 day for each of the ports 122-128, one day for each of the cards 118-120, and one day for each of the routers 114-116 during March based on planned maintenance for these network devices 114-128. Although the examples use weeks or days as measures of time for customer availability, the customer availability may be based on other units of time, such as hours, minutes, or seconds. The database manager 142 determines that 4 ports 122-128 are planned to be operational for 31 days each for the customer during March, which totals to 124 days of planned port availability. The database manager 142 uses the integrated database 144 and projected concurrent outages to calculate the projected availability for the customer's ports 122-128 in March. The planned maintenance work for the cards 118-120 and the ports 122-128 may coincide with the planned maintenance work for the first router 114 on the first Sunday in March. However, the planned maintenance work for the second router 116 is on the second Sunday in March so that the sale center 106 will have at least one available port each Sunday in March. Therefore, the 8 days of projected port 122-128 outages include 6 days of concurrent outages (1 day of outage for the first router 114 coincides with two days of outages for the cards 118-120, and the 1 day of outage for the first router 114 also coincides with 4 days of outages for the ports 122-128), which results in a total of 2 days of projected port 122-128 outages. The 2 days of projected port 122-128 outages is subtracted from the 124 days of planned port availability to result in 122 days of projected port availability. The database manager 142 divides the 122 days of projected port availability by the 124 days of planned port availability to result in a 98% projected customer availability. If the projected 98% customer availability is below a 99% customer availability based on planned maintenance outages specified in a service level agreement, the database manager 142 may output a recommendation for rescheduling some of the planned maintenance at a later date. Furthermore, the projected customer availability may also be based on historical estimates of unplanned outages to add in a margin of safety. Users of the system may receive the recommendation for rescheduling via the user interface 112 and act on the recommendation.

The database manager 142 may reassign a customer port to increase the projected customer availability. For example, the manufacturer of a frame relay router notifies the user of the database server 110 of a firmware update for a specific card on the frame relay router that operates in the network 102 maintained by the user. The user may input the specified card identification through the user interface 112, and the database manager 142 may respond by accessing the integrated database 144 to display the card data for each router for which the product data matches the specified card identification input by the user. By referencing the integrated database 144, the database manager 142 may display the card data for each customer linked to the specified card, which may be the first card 118 for the customer. The integrated database 144 indicates that the invoicing computer 130 and the collections computer 132 for the customer are linked to the first card 118. Depending on the installation requirements, the impact of the proposed action on the router may be the lack of network access for the customer during the maintenance time while the firmware update is installed for the first card 118. Alternatively, the impact of the proposed action on the first router 114 may be reduced access for the customer during the maintenance time. The database manager 142 may determine the impact of the proposed action for each customer. Based on the determined impact for the proposed action, the user may prioritize by scheduling the proposed action immediately, by scheduling the proposed action at a time when other maintenance is already scheduled, or by postponing the proposed action indefinitely.

Continuing this example, the projected customer availability based on proposed maintenance may reflect the lack of network access for the customer through the first card 118 on the first router 114, but the database manager 142 may determine that the second card 120 on the first router 114 has an unused port, the third port 126. The database manager 142 may temporarily or permanently reassign the collections computer 132 from the second port 124 on the first card 118 to the third port 126 on the second card 120. The database manager 142 either directly reassigns the collections computer 132 from the second port 124 to the third port 126 or requests a technician to unplug the link for the collections computer 132 from the second port 124 and to plug the link for the collections computer 132 to the third port 126. This reassignment may result in providing increased customer availability to the customer through the second card 120 while the firmware update is being installed on the first card 118.

Figure 2:
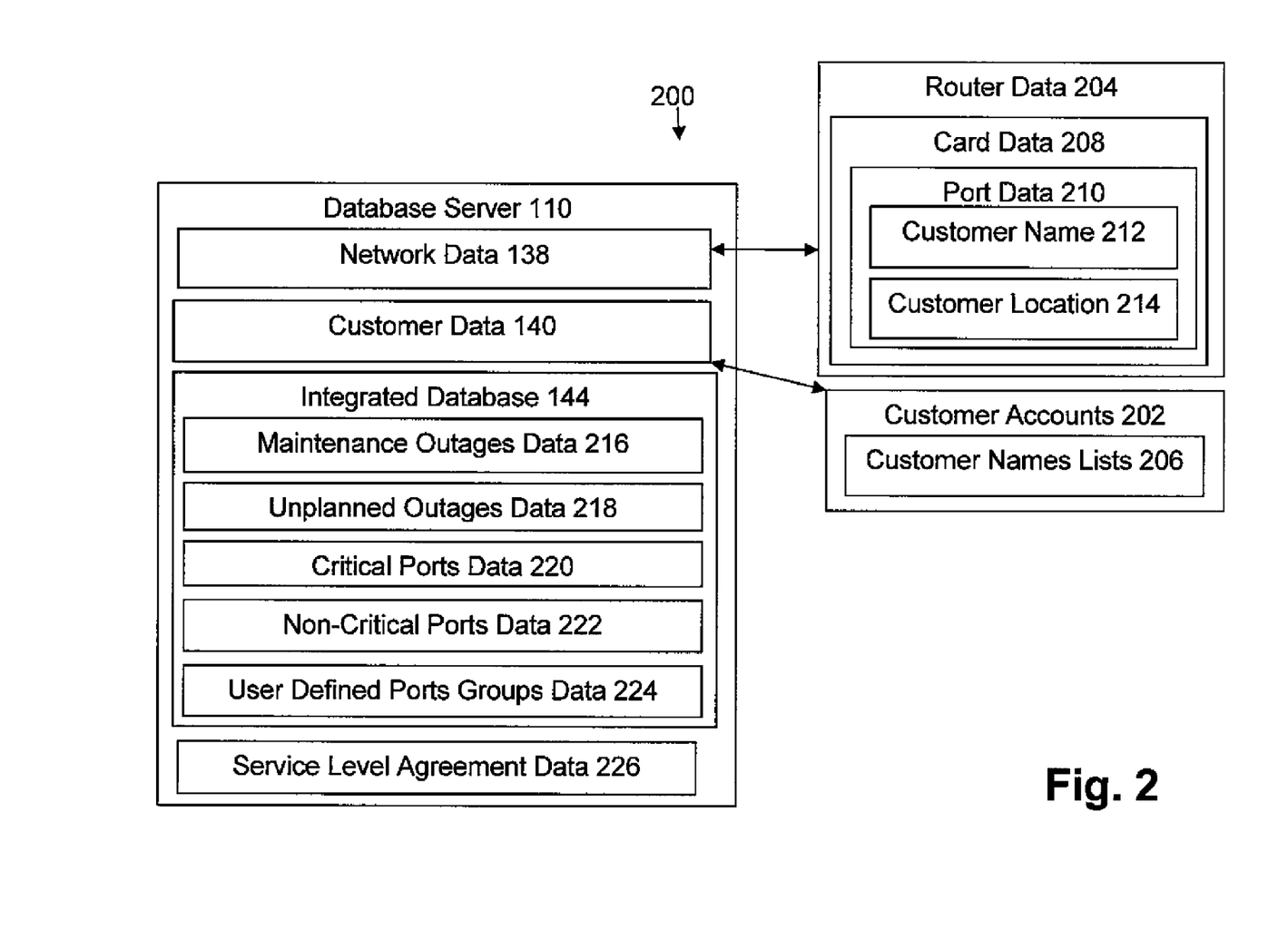
FIG. 2 illustrates a schema for a database system for translating network data into customer availability according to some embodiments of the present disclosure.

Turning now to FIG. 2, a schema for an illustrative database system 200 is depicted according to some embodiments of the present disclosure. The database system 200 includes the database server 110, customer accounts 202, and router data 204. The database server 110 includes the network data 138, the customer data 140, and the integrated database 144. The customer data 140 is related to the customer accounts 202, a customer database that includes business information, such as billing plans, billing information, and customer names lists 206.

Each of the customer names lists 206 includes a list of each customer name used by a specific customer. For example, "Acme Corp." and "Acme Homes" are customer names used by the customer Acme Homes Corporation. In contrast, "Acme Elevators" is a customer name used by a customer that is unrelated to Acme Homes Corporation. The database manager 142 uses the customer names lists 206 to integrate the network data 138 to the corresponding customer in the customer data 140 to create the integrated database 144. For example, the network data 138 for "Acme Corp." and "Acme Homes" are integrated with the customer data 140 for the customer Acme Homes Corporation, but the network data 138 for "Acme Elevator" is integrated with the customer data 140 for a different customer. The database manager 142 can access the integrated database 144 to present customer names from the customer names lists 206 to a user through the user interface 112 to enable the user to select which customer names in the customer names lists 206 correspond to which customers.

The network data 138 includes the router data 204, which includes network information, such as card data 208 for a specific router. The network data 138 can include data for multiple networks, with each network including any number of routers and data for each of the routers. The router data 204 can be based on router configuration data that is stored offline in non-volatile memory in a data store as a recovery file to enable its corresponding router to recover after power outages or router maintenance.

The card data 208 includes port data 210, which can include connectivity information that specifies which specific ports located on specific cards are connected to which customer locations. The data retriever 108 retrieves the router data 204, which the database manager 142 parses to determine the card data 208 and port data 210 related to the card data 208. Only one instance of the port data 210 is depicted for the purpose of an illustrative example, but each card can include multiple ports and the card data 208 can be related to instances of the port data 210 for each port.

The port data 210 includes a customer name 212 and a customer location 214. The database manager 142 uses the customer name 212 for a specific port with the customer names lists 206 to determine to which customer the specific port corresponds. By determining which specific ports correspond to which customers, the database manager 142 can respond to a selection through the user interface 112 of a specific customer listed in the customer names list 206 by displaying the port data 210 for each port that corresponds to the specific customer.

The customer location 214 can include a geographic location for a specific router, such as New York, Chicago, or Atlanta. The customer location 214 can also include the street address for a customer computer linked to a specific router. By relating the customer location 214 for each router to a customer, the database manager 142 can access the integrated database 144 to display the router data 204 for each router related to the customer that is at a general or specific location selected through the user interface 112. For example, if a user selects Atlanta as a general location and Acme Homes Corporation as a customer, the database manager 142 accesses the integrated database 144 to display the router data 204 for each of Acme Home Corporation's routers that are located in Atlanta. Because a customer can communicate through multiple networks from the same location, the integrated database 144 can display the name of the corresponding network along with the router data 204 for each router.

For example, the port data 210 related to the network data 138 specifies that the customer name 212 for the first port 122 is "Acme Homes," and the port data 210 related to the network data 138 specifies that the customer name 212 for the second port 124 is "Acme Corp." For this example, the database manager 142 integrates the port data 210 for the first port 122 and the port data 210 for the second port 124 with the customer data 140 for Acme Homes Corporation. The database server 110 stores this integrated network data 138 and customer data 140 in the integrated database 144. The integrated database 144 can include network data 138 that is current data and network data 138 that is historical data.

The integrated database 144 also includes maintenance outages data 216, unplanned outages data 218, critical ports data 220, non-critical ports data 222, user defined ports groups data 224, and service level agreement data 226. The maintenance outages data 216 includes data for outages that are based on planned maintenance, while the unplanned outages data 218 includes data for outages that are not planned. The critical ports data 220 includes data for outages that are defined as impacting critical ports, such as the ports 122-124 for the billing center 104 that the customer identifies as critical for business operations. The non-critical ports data 222 includes data for outages that are defined as impacting non-critical ports, such as the ports for the sale center 106 that the customer identifies as non-critical for business operations. The user defined ports groups data 224 includes data for port outages that impact user defined groups of ports based on a set of user defined rules. For example, the ports for the billing center 104 and the port for the treasury computer 136 may be defined as "cash flow" ports, a distinct group of ports for which a distinct customer availability is calculated. The user defined rules may be based on a user identification of individual ports, a customer full name, a customer short name, a remote side Internet protocol address, a network address number, a private line number, an interface description, a remote border gateway protocol autonomous system number, a router and interface name, a support office indicator code, and/or a multiprotocol label switching virtual routing and forwarding number.

Port groups may be also used to determine maintenance planning by measuring customer availability of defined subsegments of a customer's network connections. The database manager 142 may compare the customer availability to service level agreement data 226, which may specify a maintenance outage level, to determine a recommendation for a management action to output, such as rescheduling a maintenance activity. For example, if the projected port availability for a customer during March is calculated at 98% based on planned maintenance, and the customer's service level agreement specifies a maximum maintenance level outage level of 1%, the database manager 142 outputs a recommendation to reschedule some of the planned maintenance for the customer's network devices for April.

Figure 3:
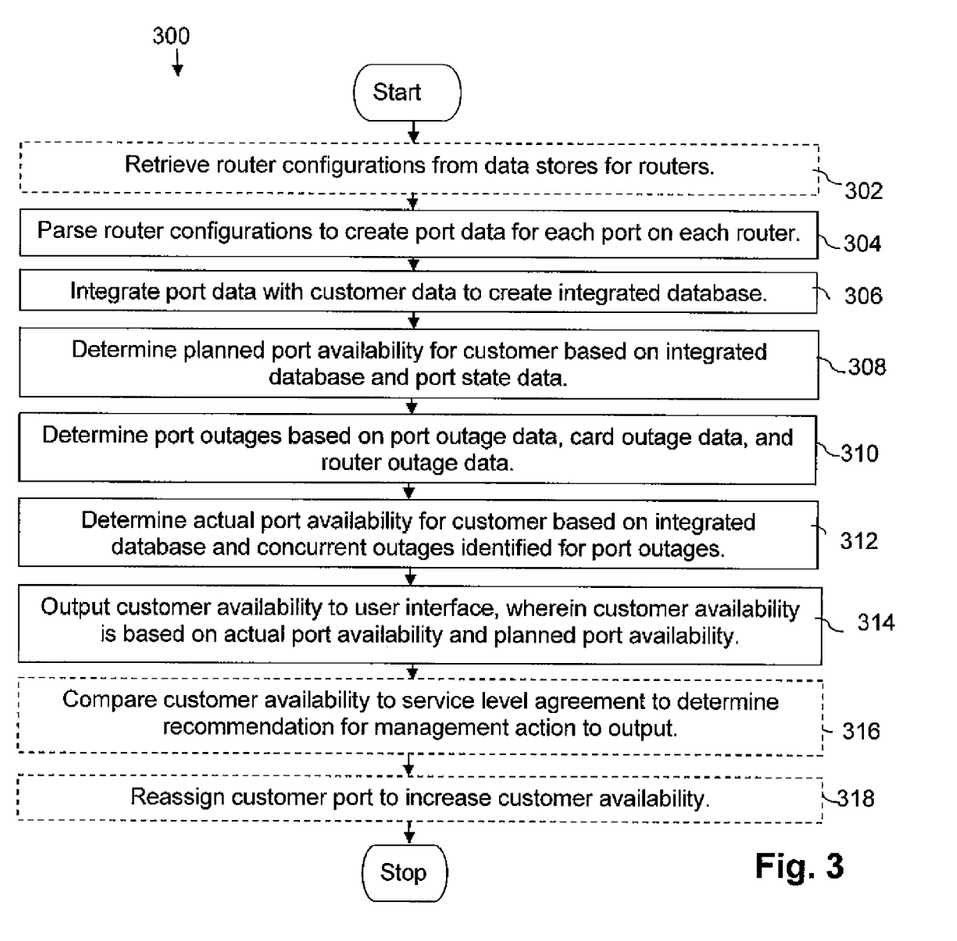
FIG. 3 is a flowchart for a method for translating network data into customer availability according to some embodiments of the present disclosure.

FIG. 3 shows a flowchart of a method 300 for translating network data into customer availability according to some embodiments of the present disclosure. The system 100 can execute the method 300 to create an integrated database that enables network data to be translated into customer port availability.

In box 302, router configurations are retrieved from data stores for routers. For example, the data retriever 108 retrieves a router configuration from the first router configuration data 146.

In box 304, the router configurations are parsed to determine the port data for each port on each router. For example, the data retriever 108 retrieves the router data 204 and the database manager 142 parses the router data 204 to determine the port data 210 for each port on each router. In another example, the data retriever 108 retrieves the router data 204 and parses the router data 204 to determine the port data 210 for each port on each router.

In box 306, the port data is integrated with the customer data to create the integrated database. For example, the database manager 142 uses the customer name 212 for each port on each router in combination with the customer names list 206 to integrate the customer data 140 with the network data 138, which includes the port data 210, to create the integrated database 144.

In box 308, planned port availability is determined for a customer based on the integrated database and port state data. For example, the database manager 142 determines that the equivalent of fourteen ports was planned to available during February for the customer.

In box 310, port outages are determined based on port outage data, card outage data, and router outage data. For example, the database manager 142 polls the ports 122-128, the cards 118-120, and the routers 114-116 to determine port outages based on port outage data, card outage data, and router outage data.

In box 312, actual port availability is determined for a customer based on the integrated database and concurrent outages identified for port outages. For example, the database manager 142 determines three weeks of port outages, two weeks of card outages, and one week of router outages during February. However, because all of these February outages were concurrent, the port had only three weeks of actual outages during February. The equivalent of fourteen ports were planned to be available a total of 56 weeks during February, which means the three weeks of port outages reduces the actual port availability for February to 53 weeks.

In box 314, customer availability is output to a user interface, wherein the customer availability is based on the actual port availability and the planned port availability. For example, the database manager 142 divides the 53 weeks of actual availability by the 56 weeks of planned availability to produce a customer availability of 95% (53 divided by 56) and outputs the customer availability of 95% to the user interface 112.

In box 316, customer availability is compared to a service level agreement to determine a recommendation for a management action to output. For example, the database manager 142 compares the customer availability of 95% for February to a service level agreement, which specifies a minimum customer availability of 95%. Based on this comparison, the database manager 142 outputs a recommendation for increasing planned maintenance for the customer network devices during March to the user interface 112.

In box 318, a customer port is reassigned to increase customer availability. For example, the database manager 142 reassigns the collections computer 132 from the second port 124 on the first card 118 to the third port 126 on the second card 120.

Figure 4:
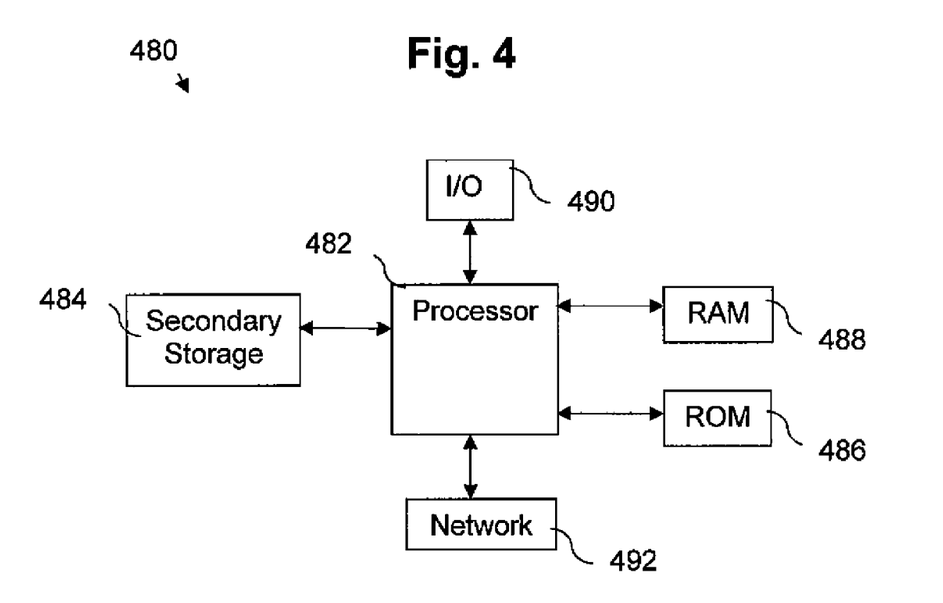
FIG. 4 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for translating network data into customer availability, comprising:
    a processor;
    a user interface; and
    a database manager, when executed by the processor, to parse router configurations to determine port data for each port on each router in a network,
        to integrate the port data with customer data to create an integrated database,
        to determine a planned port availability for a customer based on the integrated database and port state data,
        to determine port outages based on port outage data, card outage data, and router outage data,
        to determine an actual port availability for the customer that accesses a plurality of ports on a plurality of cards on a plurality of routers based on the integrated database and concurrent outages identified for the port outages, and
        to output a customer availability to the user interface, wherein the customer availability is based on the actual port availability and the planned port availability.

2. The system of claim 1, wherein the database manager parses router configurations to determine the port data for each port on each router in a plurality of networks.

3. The system of claim 1, further comprising a data retriever to retrieve the router configurations from each data store for each router.

4. The system of claim 3, wherein the data retriever polls each router to determine the port outage data, the card outage data, and the router outage data.

5. The system of claim 1, wherein the port outage data, the card outage data, and the router outage data are based on the database manager processing a network event.

6. The system of claim 1, wherein the concurrent outages are identified based on a router outage for a router that coincides with a port outage for a port associated with the router and a card outage for a card that coincides with a port outage for a port associated with the card.

7. The system of claim 1, wherein the customer availability is further based on customer availability for ports designated as critical and customer availability for ports designated as non-critical.

8. The system of claim 1, wherein the customer availability is further based on maintenance outages and unplanned outages.

9. The system of claim 1, wherein the customer availability is further based on ports assigned to a group by a set of user defined rules.

10. The system of claim 9, wherein the set of user defined rules is based on at least one of a user identification of individual ports, a customer full name, a customer short name, a remote side Internet protocol address, a network address number, a private line number, an interface description, a remote border gateway protocol autonomous system number, a router and interface name, a support office indicator code, and a multiprotocol label switching virtual routing and forwarding number.

11. The system of claim 1, wherein the database manager compares the customer availability to a service level agreement to determine a recommendation for a management action to output.

12. The system of claim 11, wherein the management action is rescheduling a maintenance activity.

13. The system of claim 11, wherein the service level agreement specifies a maintenance outage level.

14. A computer implemented method for translating network data into customer availability, comprising:
    parsing router configurations to determine port data for each port on each router in a network;
    integrating the port data with customer data to create an integrated database;
    determining a planned port availability for a customer that accesses a plurality of ports on a plurality of cards on a plurality of routers based on the integrated database and port state data;
    determining port outages based on port outage data, card outage data, and router outage data;
    determining an actual port availability for the customer based on the integrated database and concurrent outages identified for the port outages; and
    outputting a customer availability to a user interface, wherein the customer availability is based on the actual port availability and the planned port availability.

15. The computer implemented method of claim 14, wherein determining the planned port availability for the customer comprises identifying each port for the customer in the integrated database, identifying the state of each port for the customer over time based on the port state data, determining an amount of time that each port for the customer is in an operational state, and compiling a total port availability based on the amount of time that each port for the customer is in the operational state.

16. The computer implemented method of claim 14, wherein determining the actual port availability for the customer comprises identifying each port for the customer in the integrated database, identifying an amount of time that each port for the customer is associated with the port outages, identifying an amount of time that each port for the customer is associated with the concurrent outages, subtracting the amount of time that each port for the customer is associated with the concurrent outages from the amount of time that each port for the customer is associated with the port outages to determine a customer port outage time, and subtracting the customer port outage time from an amount of time associated with the planned port availability.

17. The computer implemented method of claim 14, wherein the customer availability is based on dividing the actual port availability by the planned port availability.

18. The computer implemented method of claim 14, further comprising reassigning a customer port to increase the customer availability.

19. A computer implemented method for planning maintenance, comprising:
    parsing router configurations to determine port connectivity information for each port on each router in a network;
    integrating the port connectivity information with customer data to create an integrated database;
    projecting a planned port availability for a customer that accesses a plurality of ports on a plurality of cards on a plurality of routers based on the integrated database and projected port state data;
    projecting port outages based on projected port outage data, projected card outage data, and projected router outage data;
    projecting an actual port availability for the customer based on the integrated database and concurrent outages identified for the projected port outages;
    comparing a projected customer availability to an availability specified in a service level agreement, wherein the projected customer availability is based on the actual port availability and the planned port availability; and outputting a maintenance recommendation to a user interface to promote a management action to address the maintenance recommendation, wherein the maintenance recommendation is based on comparing the projected customer availability to the availability specified in the service level agreement.

20. The computer implemented method of claim 19, wherein the projected customer availability is adjusted for a historical estimate of unplanned outages.

* * * * *